July 28, 1925.

E. R. HUNT

DETACHABLE CRANK

Filed Aug. 15, 1924

1,547,921

Earle R. Hunt INVENTOR

BY Victor J. Evans ATTORNEY

WITNESS:

Patented July 28, 1925.

1,547,921

UNITED STATES PATENT OFFICE.

EARLE R. HUNT, OF TITUSVILLE, NEW JERSEY.

DETACHABLE CRANK.

Application filed August 15, 1924. Serial No. 732,283.

*To all whom it may concern:*

Be it known that I, EARLE R. HUNT, a citizen of the United States, residing at Titusville, in the county of Mercer and State of New Jersey, have invented new and useful Improvements in Detachable Cranks, of which the following is a specification.

The object of this invention is to provide means for making the starting crank of the "Ford" type of automobile detachable so that it can be carried in the vehicle when not in use.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
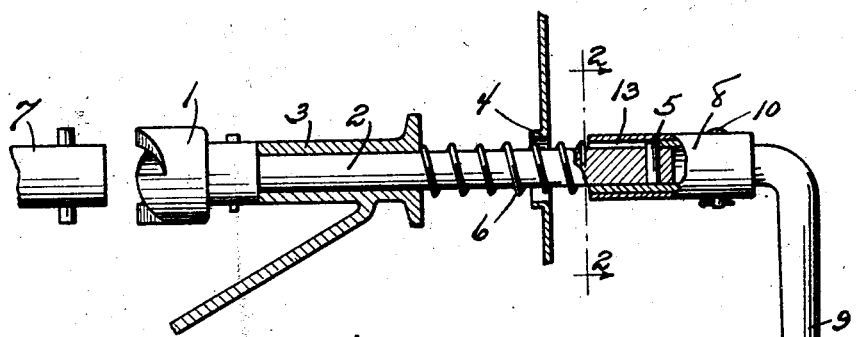
Figure 1 is a sectional view showing how the invention is used.
Figure 2:
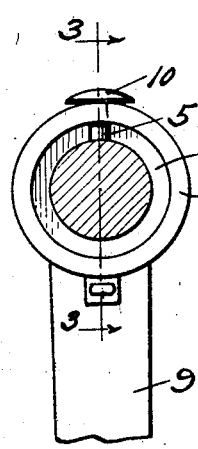
Figure 2 is a section on line 2—2 of Figure 1.
Figure 3:
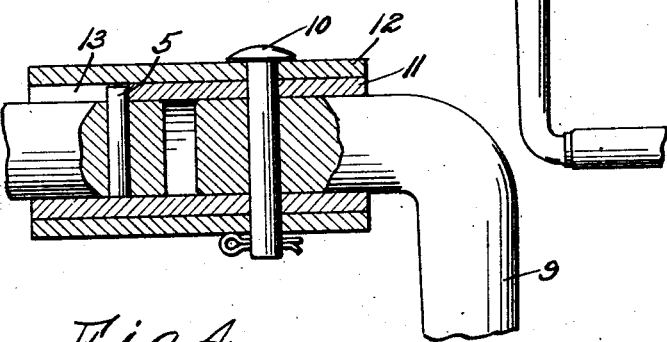
Figure 3 is a section on line 3—3 of Figure 2.
Figure 4:
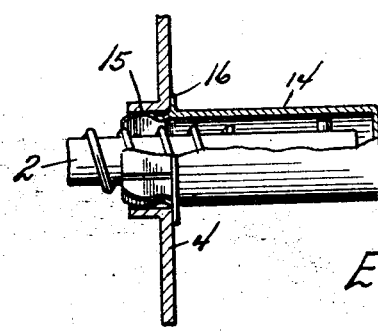
Figure 4 is a sectional detail view of a closing cap for the end of the starting shaft.

As shown in these views, I remove the crank which comes with the vehicle and attach the ratchet cap 1 to a shaft 2 which is carried by the bearing 3 of the vehicle. The shaft 2 extends through the hole 4 made for the starting crank in the front part of the vehicle and has a pin 5 at its outer end. A coil spring 6 is arranged on the shaft and has its outer end attached to the shaft and its inner end bearing against the part 3. Thus the spring tends to hold the shaft in its outward position with the ratchet cap 1 spaced from the end of the crank shaft 7 of the motor. A sleeve 8 is fastened to the handle 9 by means of a pin 10 and said sleeve 8 is composed of an inner member 11 and an outer member 12, the inner member having a slot 13 in its inner end for receiving the projecting end of the pin 5. The members 11 and 12 are parts used in the construction of the Ford type of motor vehicle, the inner member being a steel sleeve used for the starting crank while the outer member is a bronze sleeve used as the transmission driven gear sleeve bushing.

It will thus be seen that when it is desired to start the motor of the car it is simply necessary to slip the sleeve 8 over the projecting end of the shaft 2 with the pin 5 engaging the slot 13 so that when the crank is turned the turning movement of the sleeve will turn the shaft 2 due to the engagement of the pin 5 with the slot 13. Of course the parts are pushed inwardly by placing the member 1 in engagement with the shaft 7 before the crank is turned. After the motor is started the crank handle 9 can be removed and placed in the tool box or other part of the car. In order to keep dirt and dust out of the parts I provide a cap 14 for covering the projecting end of the shaft 2, this cap having a resilient bulbous part 15 for engaging the opening 4 and a flange 16 for bearing against the apron of the vehicle around said opening.

From the foregoing it will be seen that this invention will make the starting crank of the Ford type of automobile detachable the same as in other types of vehicles.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

In a motor vehicle, a shaft substituted for the starting crank thereof and having a ratchet cap attached thereto, a spring for holding the shaft in its outward position, a crank handle, a sleeve connected therewith, said sleeve consisting of an inner member and an outer member, the inner member having a slot therein and a pin on the outer end of the shaft for engaging the slot.

In testimony whereof I affix my signature.

EARLE R. HUNT.